United States Patent
Cariou et al.

(10) Patent No.: US 12,282,215 B2
(45) Date of Patent: Apr. 22, 2025

(54) DOUBLE-PASS OPTICAL FIBRE AMPLIFIER AND OPTICAL-DEVICE ARCHITECTURES

(71) Applicant: LEOSPHERE, Paris (FR)

(72) Inventors: Jean-Pierre Cariou, Bures-sur-Yvette (FR); Régis Grasser, Olivet (FR); Vincent Pureur, Saint-Chéron (FR)

(73) Assignee: LEOSPHERE, Paris (FR)

( * ) Notice: Subject to any disclaimer, the term of this patent is extended or adjusted under 35 U.S.C. 154(b) by 708 days.

(21) Appl. No.: 17/595,872

(22) PCT Filed: May 27, 2020

(86) PCT No.: PCT/EP2020/064725
§ 371 (c)(1),
(2) Date: Nov. 29, 2021

(87) PCT Pub. No.: WO2020/239848
PCT Pub. Date: Dec. 3, 2020

(65) Prior Publication Data
US 2022/0236594 A1 Jul. 28, 2022

(30) Foreign Application Priority Data
May 28, 2019 (FR) ...................................... 1905673

(51) Int. Cl.
*G02F 1/125* (2006.01)
*G02F 1/11* (2006.01)
(Continued)

(52) U.S. Cl.
CPC ............ *G02F 1/11* (2013.01); *H01S 3/06754* (2013.01); *H01S 3/08013* (2013.01);
(Continued)

(58) Field of Classification Search
CPC ............ G02F 1/11; G02F 1/116; G02F 1/125
See application file for complete search history.

(56) References Cited

U.S. PATENT DOCUMENTS

| 4,659,184 A | 4/1987 | Sohn |
| 5,463,493 A | 10/1995 | Shah |

(Continued)

FOREIGN PATENT DOCUMENTS

| EP | 2302746 A2 | 3/2011 |
| FR | 2635879 A1 | 3/1990 |

(Continued)

OTHER PUBLICATIONS

French Search Report received for Application No. 1905673, dated Feb. 20, 2020.

(Continued)

*Primary Examiner* — Joseph P Martinez
(74) *Attorney, Agent, or Firm* — Greer, Burns & Crain, Ltd

(57) ABSTRACT

An optical device including an acousto-optic modulator (AOM), a laser, an upstream optical fibre extending between the laser and the AOM, a downstream optical fibre located downstream of the AOM and a reflector connected to the fibre downstream of the AOM. The optical device including the upstream fibre is a polarisation-maintaining optical fibre, and/or the downstream fibre is arranged so that a transit time of the optical beam through said downstream fibre from the AOM to the reflecting means is nonzero and shorter than or equal to half an open duration of the AOM, and/or the AOM includes a crystal in which the entrance/exit faces are planar and are at a nonzero angle to each other, and/or at least one of the two entrance/exit faces is at a nonzero angle to a direction of propagation of the acoustic wave in the crystal.

16 Claims, 5 Drawing Sheets

(51) Int. Cl.
*H01S 3/067* (2006.01)
*H01S 3/08* (2023.01)
*H01S 3/10* (2006.01)
*H01S 3/106* (2006.01)
*H01S 3/23* (2006.01)

(52) U.S. Cl.
CPC ........ *H01S 3/10061* (2013.01); *H01S 3/1068* (2013.01); *H01S 3/2333* (2013.01)

(56) References Cited

U.S. PATENT DOCUMENTS

| | | |
|---|---|---|
| 5,574,739 A | 11/1996 | Carruthers et al. |
| 5,835,512 A | 11/1998 | Wada et al. |
| 2007/0248138 A1* | 10/2007 | Murison ................ B23K 26/21 372/20 |
| 2016/0204565 A1 | 7/2016 | Barre et al. |

FOREIGN PATENT DOCUMENTS

| | | |
|---|---|---|
| FR | 2688074 A1 | 9/1993 |
| FR | 3014604 A1 | 6/2015 |
| JP | S5528076 A | 2/1980 |
| WO | 99/30393 A1 | 6/1999 |

OTHER PUBLICATIONS

International Search Report and Written Opinion received for PCT/EP2020/064725, mailed Aug. 19, 2020.

EM4, Inc., "Acousto Optic Modulator," DS-7032, Datasheet, 2011, Retrieved from: http://www.symphotony.com/wp-content/uploads/EM4_1550_AOM_40ns.pdf, 3 pages.

Lightcomm Tech Co., Fiber Coupled Acousto-Optic Modulator Datasheet, 2007, Retrieved from: http://www.lightcomm.com/Common/Plugin/Ueditor/php/upload/20170602/1496453580331.pdf, 2 pages.

* cited by examiner

DOUBLE-PASS OPTICAL FIBRE AMPLIFIER AND OPTICAL-DEVICE ARCHITECTURES

BACKGROUND

The present invention relates to the modulation and generation of pulsed optical signals. The present invention also relates to the amplification of optical beams. The present invention aims, in particular, to generate pulsed signals with high speed, high power and small spectral width.

The present invention relates to an acousto-optic modulator, an optical device and a double-pass optical fibre amplifier.

The use of acousto-optic modulators (AOMs) of the state of the prior art for modulating an optical signal and for generating signal pulses is known. Acousto-optic modulators are used, among other things, for modulating a frequency signal and/or for modulating the intensity in order, among other things, to generate signal pulses.

An inherent drawback of the AOMs of the state of the art is found in their reflection losses corresponding to the parasitic optical signal reflected by the AOMs propagating in the opposite direction to the incident light. These reflection losses reduce the performance of the optical architectures in which the AOMs are integrated and involve adapting the operation and configuration of the architectures to counter the effect of these reflection losses.

Double-pass optical fibre amplifiers (DPOAs) comprising an AOM and a doped optical fibre amplifier (EDFA type) are a type of architecture of the state of the art in which the AOMs are integrated and the reflection losses of which limit the performance. The reflection losses of the AOMs cause a distortion of the temporal shape of the signals emitted by the DPOA by generating unstable overmodulations and, in order to prevent this, require that this type of architecture be made more complex by adding components, for example one or more additional AOMs, and that the performance of certain components be restricted, for example that the gain of the EDFA(s) be reduced.

An aim of the invention is in particular:
to attenuate the overmodulations in the temporal signal that are generated by the reflection losses in the DPOAs, and/or
to attenuate the reflection losses of the AOMs, and/or
to improve the performance of the DPOAs comprising at least one AOM.

SUMMARY

To this end, an optical device is proposed comprising:
an acousto-optic modulator (AOM),
a laser capable of generating an optical beam,
an optical fibre, called upstream fibre, extending between the laser and the AOM, in which one or more optical beams is or are intended to propagate towards and/or originating from the AOM,
an optical fibre, called downstream fibre, situated downstream of the AOM with respect to a direction linking the upstream fibre to the AOM, in which the optical beam(s) is/are intended to propagate towards and/or originating from the AOM,
a reflection means connected to the downstream fibre of the AOM and arranged to reflect a beam originating from the downstream fibre into the downstream fibre.

According to the invention:
the upstream fibre is a polarization-maintaining optical fibre capable of maintaining a linear polarization state of an optical beam, and/or
the downstream fibre is arranged so that a transit time of the optical beam in said downstream fibre from the AOM up to the reflection means is non-zero and less than or equal to half of the open time of the AOM, and/or
the AOM is an AOM according to the invention as defined in the present application.

Any one or more of the characteristics of the AOM according to the invention can be introduced in the AOM of the optical device according to the invention.

The downstream fibre can be arranged so that the transit time of the optical beam in said downstream fibre from the AOM up to the reflection means is non-zero and less than or equal to a quarter of the open time of the AOM. The downstream fibre can be arranged so that the transit time of the optical beam in said downstream fibre from the AOM up to the reflection means is equal to one-sixth of the open time of the AOM.

The transit time of the beam in the downstream fibre is modified by varying the length of the downstream fibre between the AOM and the reflection means.

The optical beam or beams intended to propagate in the upstream fibre towards the AOM can be linearly polarized. Advantageously, the optical beam generated by the laser is linearly polarized.

The downstream fibre can be a polarization-maintaining optical fibre and the optical beam or beams intended to propagate in the upstream fibre towards the AOM can be linearly polarized so that the reduction of the temporal fluctuations by the AOM is improved. The reduction of the temporal fluctuations by the AOM is improved by cancelling out and/or reducing the interferences in the downstream fibre between:
a parasitic beam propagating in the crystal in the direction of the downstream fibre, and
a linearly polarized beam, originating from the upstream fibre, propagating in the crystal in the direction of the downstream fibre. The parasitic beam can thus be linearly polarized normal to the polarization of the beam originating from the upstream fibre so as to suppress and/or reduce the interferences in the downstream fibre originating from a mixture of waves polarized in parallel.

The parasitic beam propagating in the crystal can be a portion of a beam intended to exit the crystal of the AOM on the side of the upstream fibre reflected in the crystal through one of the two input/output faces of the crystal situated on the side of the upstream fibre.

The upstream and downstream fibres can be connected respectively to one of the two input/output faces of the crystal of the AOM situated on the side of the upstream fibre and to the other of the two input/output faces of the AOM situated on the side of the downstream fibre. The term "connected" within the meaning of the invention does not mean linked or joined but means that a unilateral or bilateral transmission of beams between two "connected" components is permitted. The input/output angle formed by the arrangement of the upstream and downstream fibres, and/or the non-zero angle formed between the input/output faces and/or the non-zero angle formed between the direction of propagation and the parallel input/output faces of the crystal, allows a portion, reflected in the crystal through one of the two input/output faces, of a beam intended to exit the crystal in order to be coupled to one of the upstream and downstream fibres to have, after having exited the crystal through the other of the two input/output faces, a direction different from a direction of the optical beam(s) intended to propagate from the AOM towards the other of the upstream and downstream fibres. In other words, the input/output angle formed by the arrangement of the upstream and downstream fibres, and/or the non-zero angle formed between the input/output faces of the crystal and/or the non-zero angle formed between the direction of propagation and the parallel input/output faces of the crystal, allows a portion, reflected in the crystal through one of the two input/output faces situated on the side of the upstream fibre, or respectively on the side of the downstream fibre, of a beam intended to exit the AOM on the side of the upstream fibre, or respectively in the direction of the downstream fibre, to have, after having exited the crystal through the other of the input/output faces, a direction different from a direction of the beam intended to exit the AOM on the side of the downstream fibre, or respectively of the upstream fibre. In other words, the input/output angle formed by the arrangement of the upstream and downstream fibres, and/or the non-zero angle formed between the two input/output faces of the crystal and/or the non-zero angle formed between the direction of propagation and the parallel input/output faces of the crystal, allows a portion, reflected in the crystal through one of the two input/output faces, of a beam intended to exit the crystal to not be coupled to one of the upstream and downstream fibres situated on the side of the other of the input/output faces.

It is directly and unambiguously noted that the combinable alternatives of the optical device according to the invention produce at least one common technical effect making it possible to obtain, as a minimum, at least one of the objectives according to the invention. The combinable alternatives under consideration are that the upstream fibre is a polarization-maintaining optical fibre and/or that the downstream fibre is arranged so that a transit time of the optical beam in said downstream fibre from the AOM up to the reflection means is non-zero and less than or equal to half of an open time of the AOM and/or that the AOM is an AOM according to the invention.

The acousto-optic modulator according to the invention can comprise:
  a crystal,
  a piezoelectric oscillator in contact with a face of the crystal, called injection face, capable of generating an acoustic wave propagating in the crystal,
  an acoustic absorber arranged on a face of the crystal, called absorption face, capable of at least partly absorbing the acoustic wave after it has propagated in the crystal from the injection face up to the absorption face;
the acousto-optic modulator being characterized in that:
  two opposite faces of the crystal, called input/output faces, through which one or more optical beams is or are intended to enter and/or exit the crystal, form a non-zero angle between them, and/or
  at least one of the two opposite faces forms a non-zero angle with a direction of propagation of the acoustic wave in the crystal, called direction of propagation.

According to the invention, the non-zero angle that the two input/output faces form with one another and/or the non-zero angle that the at least one of the two opposite faces forms with the direction of propagation are such that a beam intended to exit the crystal which is reflected in the crystal through one of the two input/output faces has, after having exited the crystal through the other of the two input/output faces, a direction different from a direction:
  of the optical beam(s) intended to enter the crystal through the other of the two input/output faces, and/or
  of the optical beam(s) intended to exit the crystal, after having exited the crystal, by the other of the two input/output faces.

According to the invention, the direction of propagation of the acoustic wave in the crystal defines the direction in which the acoustic wave propagates inside the crystal.

A beam intended to enter the AOM propagates from the outside of the crystal towards one of the input/output faces. A beam intended to exit the AOM propagates in the AOM towards one of the input/output faces.

According to the invention, the crystal can be a parallelepiped.

Preferably, the input/output faces of the AOM are planar. Preferably, the input/output faces of the AOM are comprised in and/or are included in and/or constitute and/or extend in a plane extending from the injection face up to the absorption face.

It is directly and unambiguously apparent that the two characteristics of the AOM according to which the input/output faces form a non-zero angle with one another and at least one of the two opposite faces forms a non-zero angle with the direction of propagation of the acoustic wave in the crystal contribute to obtaining, as a minimum, a common technical effect making it possible to achieve at least one of the objectives described in the present application.

According to a first variant of the invention, the direction of propagation can form any non-zero angle with a straight line, called straight line of intersection, formed by an intersection between the two input/output faces of the crystal. The straight line of intersection of the input/output faces of the crystal corresponds to the straight line formed by the intersection of two planes respectively including the input and output faces of the crystal.

The two input/output faces of the crystal can be arranged so that the non-zero angle formed between the straight line of propagation and the straight line of intersection is such that a beam intended to exit the crystal which is reflected in the crystal through one of the two input/output faces has, after having exited the crystal through the other of the two input/output faces, a direction different from a direction:
  of the optical beam(s) intended to enter the crystal through the other of the two input/output faces, and/or
  of the optical beam(s) intended to exit the crystal, after having exited the crystal, by the other of the two input/output faces.

Preferably, the AOM comprises a single straight line of intersection.

According to the first variant of the invention, the straight line of intersection can be perpendicular to the direction of propagation.

According to the first variant of the invention, the input/output faces of the crystal can be arranged so that a zero angle is formed between:
  a direction of the optical beam(s) intended to enter the crystal and/or exit the crystal, after having exited the crystal, by one of the two input/output faces, and
  a direction of the optical beam(s) intended to enter the crystal and/or exit the crystal, after having exited the crystal, by the other of the two input/output faces.

According to a second variant of the invention, the direction of propagation can be parallel to the straight line of intersection.

Preferably, according to the invention, the direction of propagation and the straight line of intersection can be comprised in a plane extending from the injection face towards the absorption face.

The plane formed between the direction of propagation and the straight line of intersection can be perpendicular to:

the direction of the optical beam(s) intended to enter and/or exit the crystal, after having exited, by one of the two input/output faces, and/or the direction of the optical beam(s) intended to enter and/or exit the crystal, after having exited, by the other of the two input/output faces.

Preferably, according to the invention, an angle formed between one of the two input/output faces of the crystal and a direction of the optical beam(s) intended to enter the crystal and/or exit the crystal, after having exited the crystal, by said one of the two input/output faces can be identical to an angle formed between the other of the two input/output faces of the crystal and a direction of the optical beam(s) intended to enter the crystal and/or exit the crystal, after having exited the crystal, by said other of the two input/output faces.

According to a third variant of the invention, the input/output faces of the crystal can be parallel to one another and can form a non-zero angle with the direction of propagation. According to the third variant of the invention, the crystal can be an oblique prism.

According to the third variant of the invention, an angle formed between one of the two input/output faces of the crystal and a direction of the optical beam(s) intended to enter the crystal and/or exit the crystal, after having exited the crystal, by said one of the two input/output faces can be different from an angle formed between the other of the two input/output faces of the crystal and a direction of the optical beam(s) intended to enter the crystal and/or exit the crystal, after having exited the crystal, by said other of the two input/output faces.

Preferably, according to the invention, an angle formed between one of the two input/output faces of the crystal and the direction of propagation can be identical to an angle formed between the other of the two input/output faces of the crystal and the direction of propagation.

Preferably, according to the invention, apart from for the third variant, the crystal can be a right prism.

More preferably, according to the invention, apart from for the third variant, the crystal can be a right prism with a trapezoidal base.

According to the invention, the optical device can also comprise a splitter arranged to unilaterally connect:

an input of the device to a portion of the upstream fibre linking the splitter to the AOM so that an optical beam emitted by the laser, propagating in a portion of the upstream fibre linking the laser to the input of the optical device, is injected by the splitter into the portion of the upstream fibre linking the splitter to the AOM in the direction of the AOM, and the portion of the upstream fibre linking the AOM to the splitter at an output of the optical device so that a return beam propagating in the upstream fibre from the AOM towards the splitter is injected by the splitter towards the output of the optical device.

According to the invention, the upstream fibre can be defined as comprising two optical fibres:

an optical fibre linking the laser to the input of the optical device, and an optical fibre linking the AOM to the splitter.

The reflection means for an optical beam can be capable of modifying the polarization of a polarized optical beam.

According to the invention:

the reflection means can be capable of modifying the polarization of an optical beam polarized linearly by a value of 90°.

the reflection means can comprise a mirror with a Faraday rotator and/or a reflective Bragg grating.

According to the invention, the downstream fibre can be a polarization-maintaining optical fibre.

The upstream and downstream fibres can be polarization-maintaining so as not to need to be arranged in an alignment aiming to maintain the polarization state of the optical beam during the coupling in the downstream fibre. This makes it possible to reduce a time for aligning fibre collimators on either side of the AOM during its manufacture.

According to the invention, the downstream fibre can be a pumped optical fibre amplifier.

According to the invention, the device can be a double-pass optical fibre amplifier.

According to the invention, the device can comprise a processing unit arranged and/or configured and/or programmed to control the laser and/or the acousto-optic modulator and/or pumping means associated with the pumped optical fibre so that the return beam at the output of the optical device is a pulsed optical beam having:

a frequency greater than 100 Hz and/or less than 500 kHz, and/or a power greater than 10 mW and/or less than 500 W, and/or a temporal width greater than 1 nanosecond (ns) and/or less than 1 ms.

BRIEF DESCRIPTION OF THE DRAWINGS

Other advantages and features of the invention will become apparent on reading the detailed description of implementations and embodiments that are in no way limitative, and from the following attached drawings.

DETAILED DESCRIPTION

As the embodiments described hereinafter are in no way limitative, variants of the invention can in particular be considered comprising only a selection of the characteristics described, in isolation from the other characteristics described (even if this selection is isolated within a sentence comprising these other characteristics), if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

Figure 1:
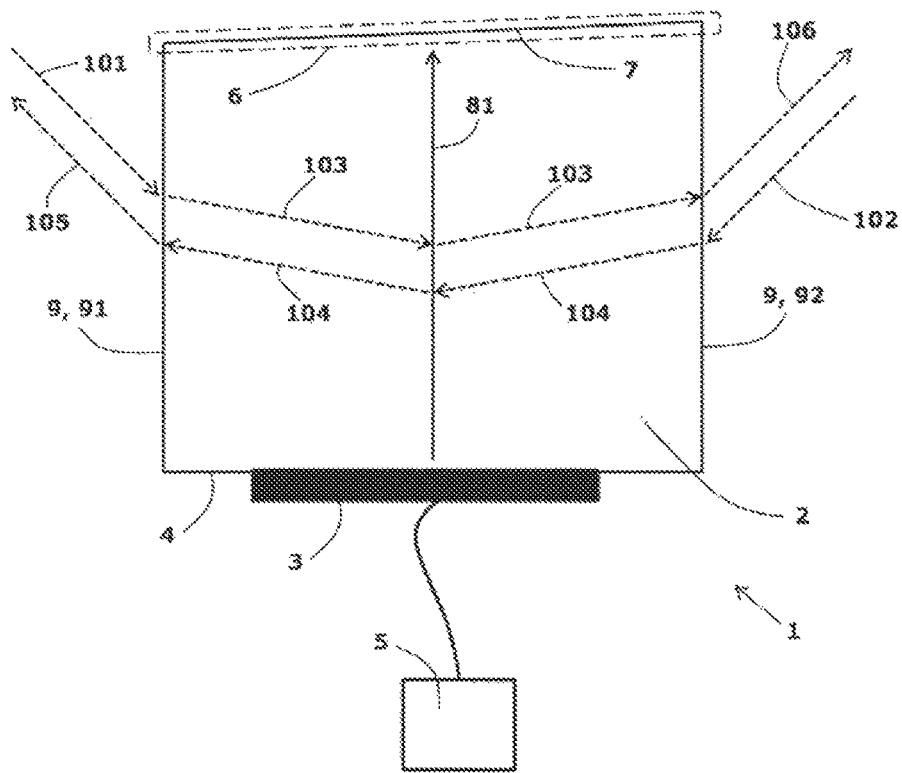
FIG. 1 illustrates a diagrammatic representation of a side view of an AOM of the state of the art.

FIG. 1 illustrates an acousto-optic modulator (AOM) of the state of the art according to an arrangement called conventional. An AOM 1 comprises a crystal 2 composed of a crystalline or amorphous material, for example glass or quartz. It also comprises a piezoelectric oscillator 3 in contact with a face of the crystal 4, called injection face 4. An alternating signal is emitted at a given frequency by a transmitter 5. This alternating signal actuates the piezoelectric oscillator 3, which vibrates at a frequency which depends on the given frequency of the alternating signal. The vibrations of the piezoelectric oscillator generate an acoustic wave propagating in the crystal 2. The AOM 1 also comprises an acoustic absorber 6 arranged on a face 7 of the crystal, called absorption face 7. The absorber 6 absorbs the acoustic wave after it has propagated in the crystal 2 from the injection face 4 up to the absorption face 7. The function of the absorber is to reduce the power of the acoustic wave to reflect the acoustic wave in the crystal and thus create a parasitic additional intensity modulation of an optical beam propagating in the crystal. The AOMs 1 comprise two opposite faces 9, 91 and 9, 92, called input/output faces 9, 91, 92, parallel to one another. The input/output faces 9, 91, 92 are passed through by beams intended to enter 101, 102 the crystal 2, called entering beams, and by beams intended to exit 103, 104 the crystal 2. The input/output faces 9, 91, 92 are arranged so that the entering beams 101, 102, after having entered the crystal 2, propagate in the crystal 2 and become the beams intended to exit 103, 104 the crystal 2. The input/output faces 9, 91, 92 are arranged so that the intended beams exit 103, 104 the crystal 2, after having passed through the input/output faces 9, 91, 92, become exiting beams 105, 106 propagating in the same direction as the beams intended to enter 101, 102 the crystal 2. the plane of propagation of the beams incident and reflected by the acoustic wave inside the crystal, called plane of propagation. Inside the crystal, the beam entering by the input face and the beam reflected by the acoustic wave and being directed towards the output face form an angle with one another and have a common point at the level of the acoustic wave. These two beams thus form a plane.

The AOMs 1 of the state of the art cause the appearance of parasitic beams 11, also called reflection losses, when they are in operation. The inventors have observed that, when the input/output faces 9, 91, 92 are not parallel to one another, a considerable reduction in the appearance of such parasitic beams 11 is observed. Also, according to the invention, in order to limit, or even suppress, the appearance of these parasitic beams 11, an acousto-optic modulator 1 is proposed, with reference to FIGS. 3 and 4, in which the two opposite input/output faces 9, 91, 92 of the crystal 2 form a non-zero angle with one another.

Figure 2:
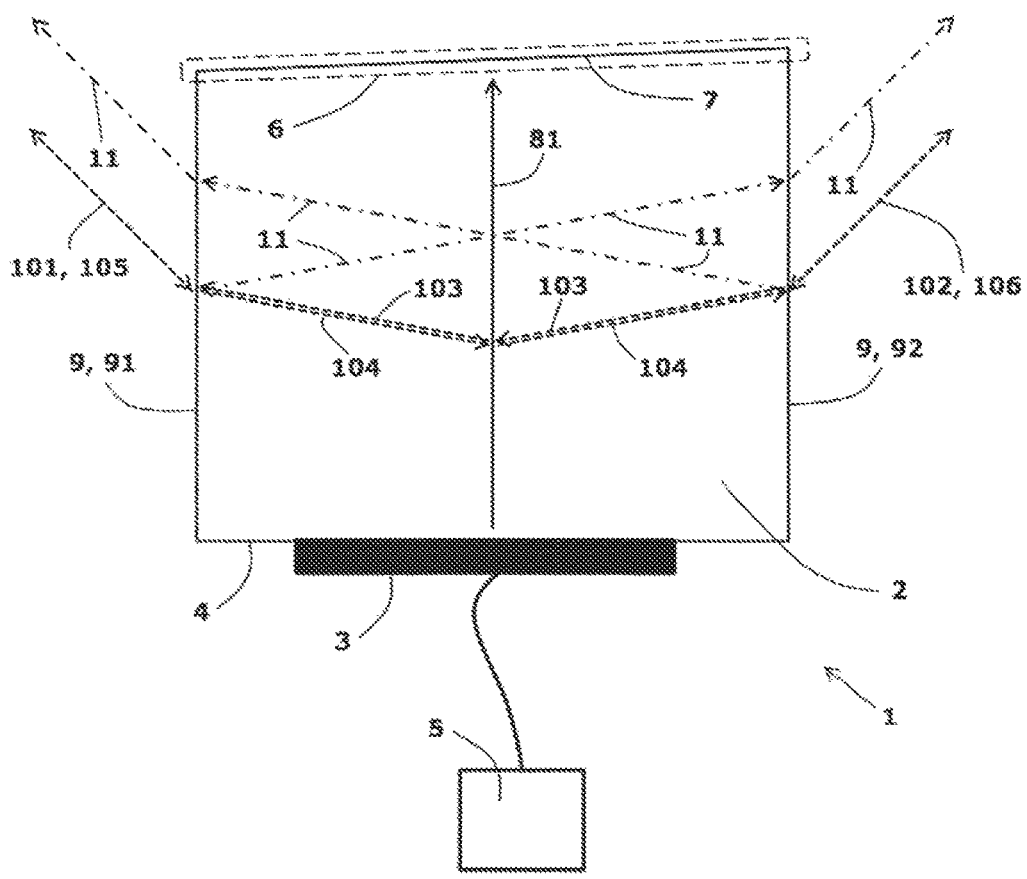
FIG. 2 illustrates a diagrammatic representation of the reflection losses of an AOM of the state of the art in a side view.

With reference to FIG. 2, the inventors have put forward the hypothesis that these parasitic beams 11 arise from the reflection, in the crystal 2, of a portion of the beams intended to exit 103, 104 the crystal 2 on the input/output faces 9, 91, 92. These parasitic beams 11, i.e. the reflected portion 11 of the beams intended to exit 103, 104 the crystal 2, are not modulated by the AOM 1 and exit the crystal 2 in a direction parallel to the direction of the exiting beams 105, 106 and of the beams intended to enter 101, 102 the crystal 2.

Figure 3:
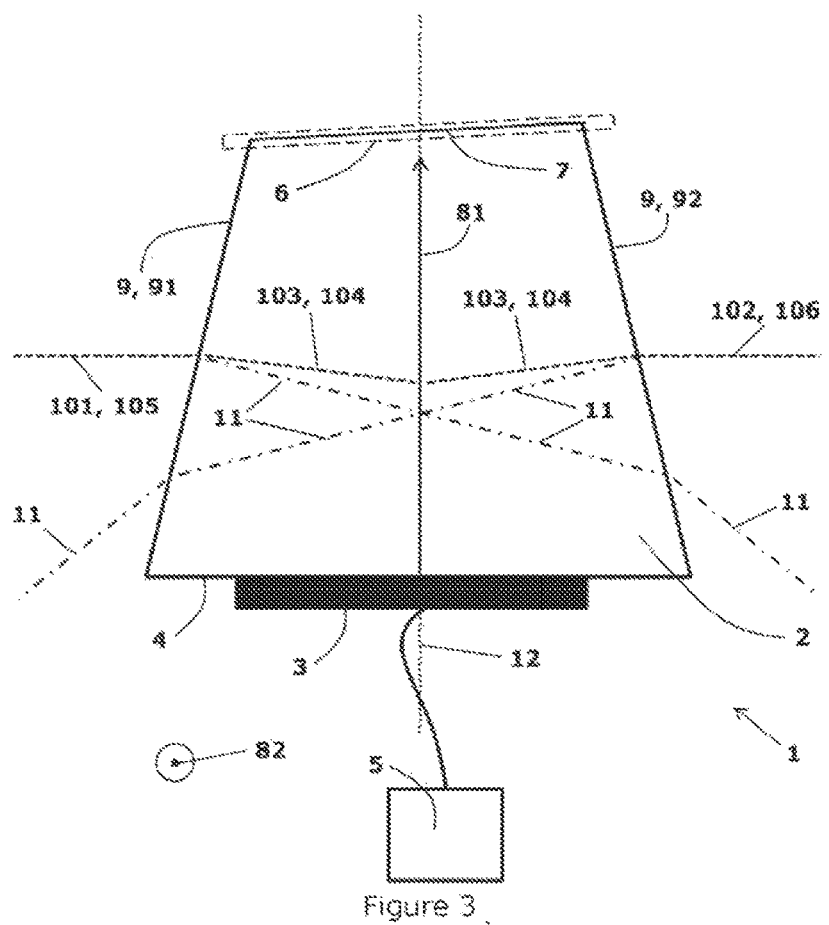
FIG. 3 illustrates a diagrammatic representation of a side view of an AOM according to a first embodiment of the first variant of the invention.
Figure 5:
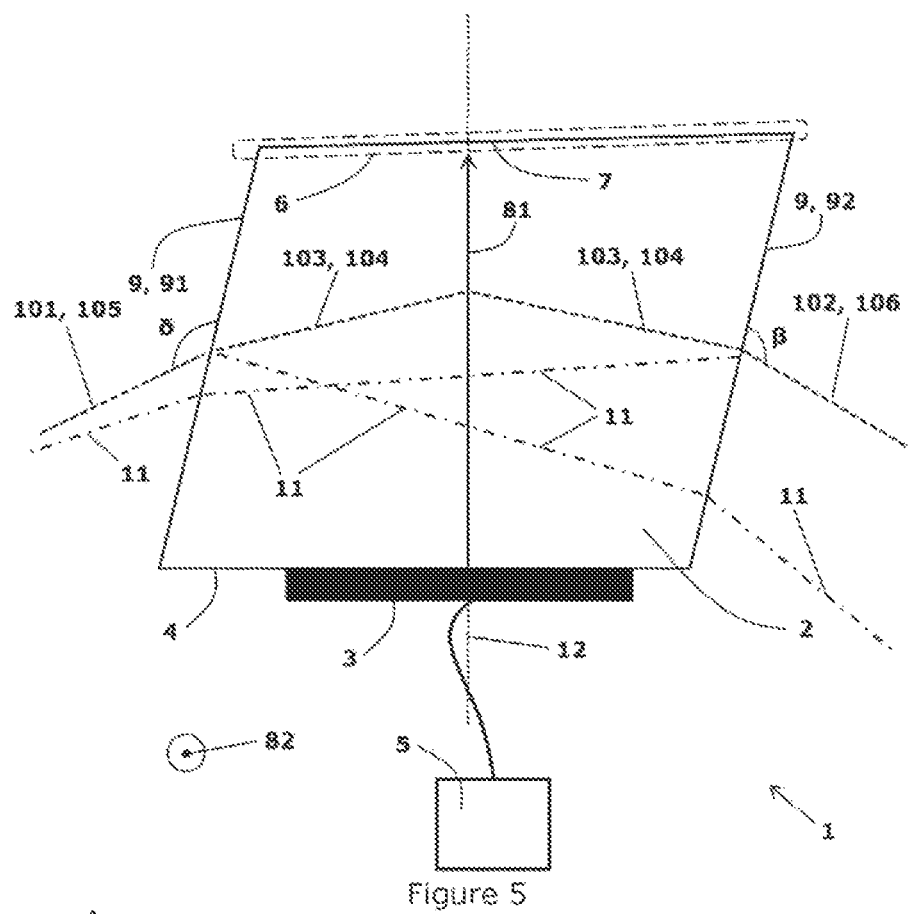
FIG. 5 illustrates a diagrammatic representation of a side view of an AOM according to a third embodiment of the third variant of the invention.

With reference to FIGS. 3 and 5, the AOMs 1 according to the invention are arranged in order that the parasitic beams 11 are not coupled to the exiting beams 105, 106. The crystal 2 is arranged so that the parasitic beams, after having exited the crystal 2 by one of the input/output faces 9, 91, 92, have a direction different from the direction of the exiting beams 105, 106.

Figure 4:
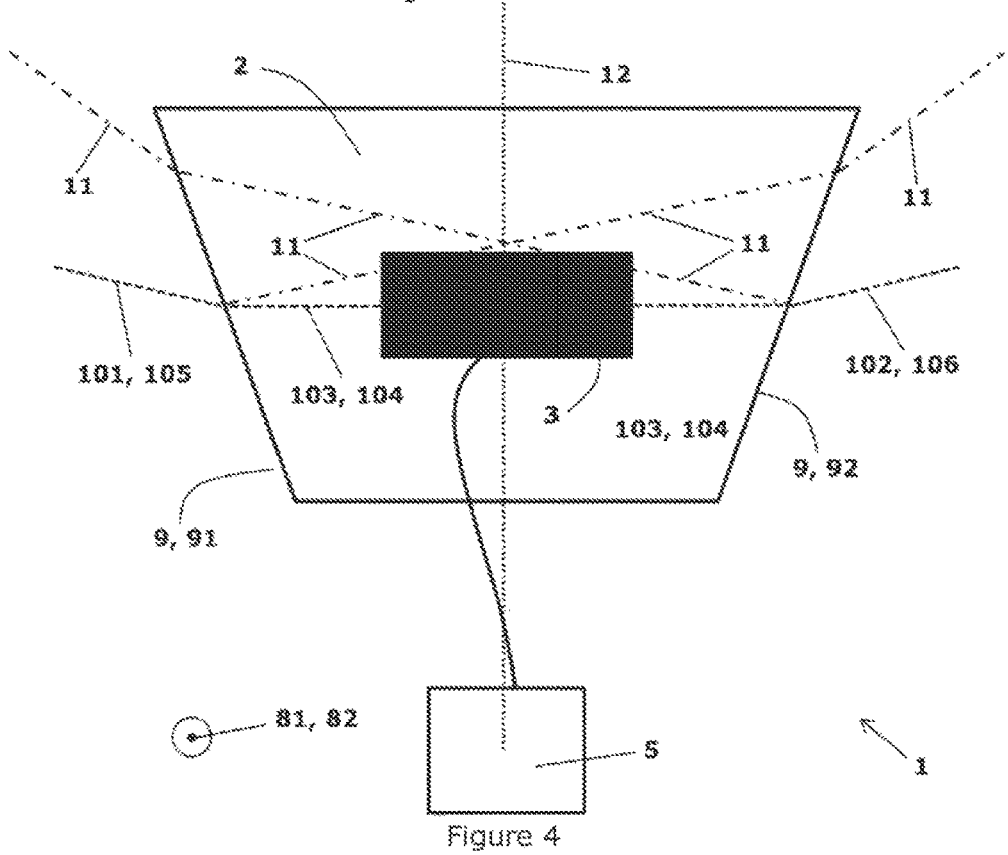
FIG. 4 illustrates a diagrammatic representation of a view from below of an AOM according to a second embodiment of the second variant of the invention.

With reference to FIGS. 3 and 4, the angle formed between the two opposite input/output faces 9, 91, 92, or the angle formed by the faces with the direction of propagation, has the effect that the parasitic beams 11 propagate in the crystal 2 in a direction different from that of the beams intended to exit 103, 104 the crystal 2 and exit the crystal 2 in a direction different from that of the exiting beams 105, 106 and of the beams intended to enter 101, 102 the crystal 2. The direction of propagation is perpendicular to the piezoelectric oscillator 3. A straight line of intersection (not shown) of the opposite input/output faces 9, 91, 92 and the direction of propagation 81 of the acoustic wave in the crystal 2 are comprised in a plane 12 extending between the injection face 4 and the absorption face 7. The angle formed between the input face 9, 91 and the direction of propagation is identical to the angle that the output face 9, 92 and the direction 1s of propagation form. Moreover, the angle that the input face 9, 91 forms with the plane 12 is identical to the angle that the output face 9, 92 forms with the plane 12.

With reference to FIGS. 3 to 5, an AMTIR crystal 2 is used, excited with an acoustic wave of 40 MHz and passed through by beams 101, 102, 103, 104, 105, 106 with a wavelength of 1.54 μm under vacuum.

With reference to FIGS. 3 and 4, the angle formed between the input face 9, 91 and the output face 9, 92 is comprised between 0.5° and 5°, the angle is typically of the order of 1°. This makes it possible to obtain exiting beams 105, 106 and beams intended to enter 101, 102 which are parallel.

With reference to FIG. 3, according to a first embodiment, the input/output faces 9, 91, 92 of the AOM 1 form an angle with one another such that the entering beams 101, 102 and the exiting beams 105, 106 are parallel to one another and perpendicular to the direction of propagation 81 of the acoustic wave. The direction 82 in which the straight line of intersection extends is perpendicular to the direction of propagation 81 of the acoustic wave. The direction of propagation 81 and the straight line of intersection belong to the same plane.

With reference to FIG. 4, according to a second embodiment, the direction 82 in which the straight line of intersection extends is parallel to the direction of propagation 81 of the acoustic wave. The direction of propagation and the straight line of intersection are parallel.

With reference to FIG. 5, according to a third embodiment, the input/output faces 9, 91, 92 of the AOM 1 are parallel to one another and form a non-zero angle with the direction of propagation 12. Here, the direction of propagation 81 and the straight line of intersection do not form part of one and the same plane but belong to two distinct planes.

According to the third embodiment, the angle s formed between the output face 9, 92 and the beams 102, 106 passing through it is different from the angle δ formed between the input face 9, 91 and the beams 101, 105 passing through it.

It is directly and unambiguously apparent that each of the embodiments illustrated in FIGS. 1 to 5 shows an AOM 1 the input/output faces 9, 91, 92 of which are planar. The input/output faces 9, 91, 92 of the AOM 1 are comprised in a plane and extend from the injection face 4 up to the absorption face 7.

Given that each of the two input/output faces 9, 91, 92 are planar, each of the embodiments illustrated in FIGS. 1 to 5 shows an AOM 1 comprising a single straight line of intersection.

Figure 6:
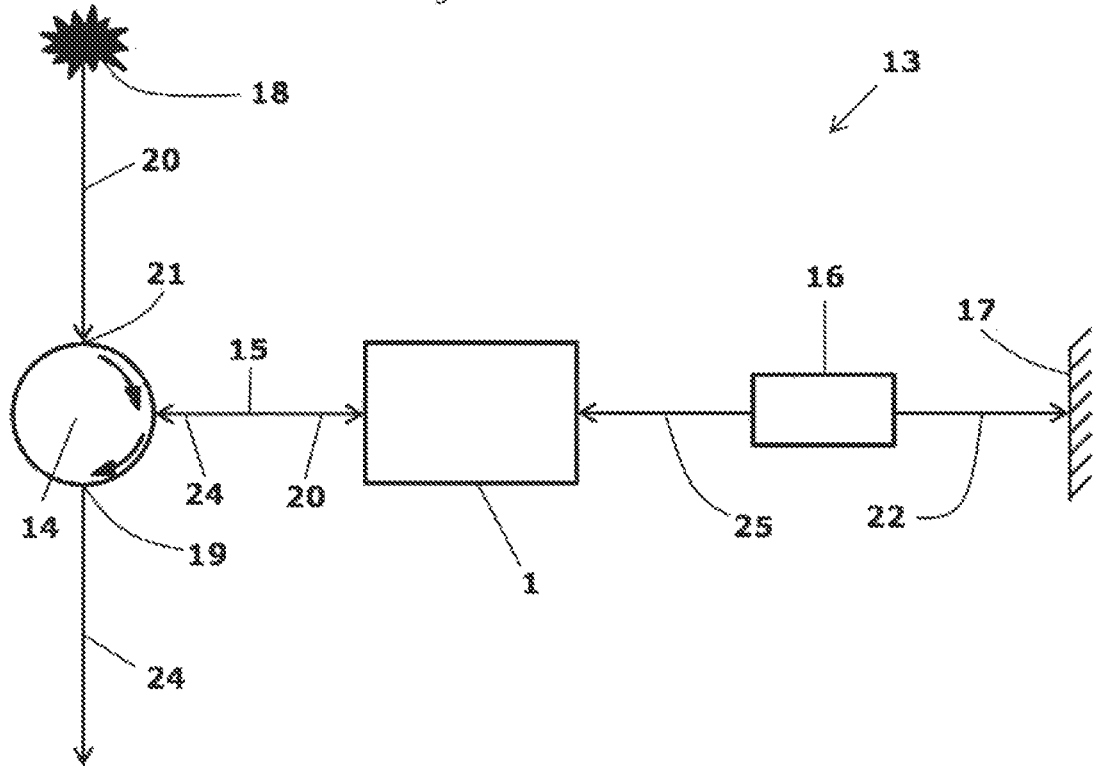
FIG. 6 illustrates a diagrammatic representation of a DPOA of the state of the art.

With reference to FIG. 6, a double-pass optical fibre amplifier (DPOA) 13 of the state of the art is presented. The DPOA 13 comprises a polarization splitting coupler (PBS) 14, an optical fibre 15, called upstream fibre 15, linking the PBS 14 to an AOM 1 of the state of the art as described above, a doped optical fibre amplifier (EDFA) 16, the optical fibre of which it is composed being called downstream fibre 16, linking the AOM 1 to a Faraday mirror 17 and a laser 18 emitting an optical beam 20 in the direction of an input 21 of the PBS 14. The PBS 14 unilaterally connects the laser 18 to the upstream fibre 15 so that the optical beam 20 emitted by the laser 18 propagates in the upstream fibre 15 in the direction of the AOM 1. The PBS 14 also unilaterally connects the upstream fibre 15 to an output 19 of the DPOA 13 so that a return optical beam 24, amplified twice and shaped, propagating in the upstream fibre 15 from the AOM 1 towards the PBS 14 is injected by the PBS 14 towards the output 19 of the DPOA 13. The optical beam 20, after having exited the AOM 1, is first amplified in the EDFA in order 16 to constitute an amplified outward beam 22, then is reflected by the Faraday mirror 17 and amplified a second time in the EDFA 16, before once again passing through the AOM 1.

According to the invention, the DPOA 13 comprises a processing unit arranged and/or configured and/or programmed to control the laser 18, the AOM 1, pumping means (not shown) associated with the DOFA 16 so that the return beam 24 at the output 19 of the DPOA 13 is a pulsed optical beam 24 having a frequency comprised between 100 Hz and 500 kHz, a power comprised between 10 mW and 500 W, and a temporal width comprised between 1 nanosecond (ns) and 1,000,000 ns.

FIGS. 6 to 11 are simulations of optical pulses 24 obtained at the output 19 of optical architectures having the DPOA 13 described above as a base. The simulations are produced on the basis of the Jones formalism and take account of the development of the polarization state and the transmitted power at any point of the DPOA 13.

With reference to FIG. 6, when a DPOA 13 of the state of the art as defined above (no production of AOM 1 in order to reduce the reflection losses and no polarization-maintaining fibre or additional fibre length) is used to modify the optical beam 20 emitted by the laser 18 in the form of amplified optical pulses 24, the return optical beam 24 at the output 19 of the DPOA 13 has overmodulations 23. It should be noted that the profile of the overmodulations 23 is unstable and unpredictable. This behaviour is particularly detrimental to the practical use of this type of architecture.

According to a first improvement of the DPOA 13 of the state of the art described above, the upstream fibre 15 is a polarization-maintaining optical fibre 15 capable of maintaining the linear polarization state of the optical beam 20 emitted by the laser 18. This improvement makes it possible for the portion 11 reflected by the input face 9, 91 of the crystal 2 of the AOM 1 of the amplified return beam 25, corresponding to the entering beam 102, propagating in the AOM 1, originating from the DOFA 16 in the direction of the upstream fibre 15, to have a linear polarization state normal to that of the optical beam 20 emitted by the laser 18, corresponding to the entering beam 101, propagating in the AOM 1, originating from the upstream fibre 15 in the direction of the DOFA 16. It should be noted that, even if the intensity of the reflected portion 11 is negligible compared with the intensity of the optical beam 20, the fact that it has already been amplified twice in the DOFA 16 makes its intensity non-negligible when it is coupled to the optical beam 20 at the input of the DPOA 13.

Figure 7:
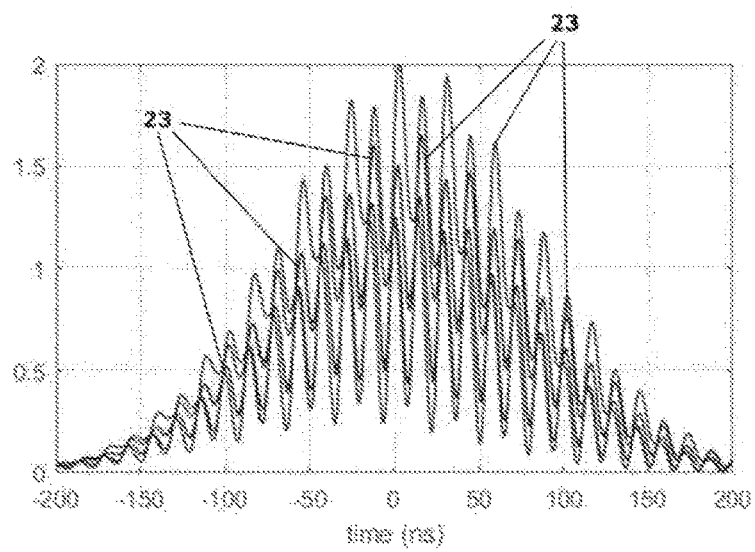
FIG. 7 illustrates a simulation of a pulse, comprising usual overmodulations, obtained by a DPOA of the state of the art.

With reference to FIG. 7, the effect of the first improvement which partly cancels out the interferences between the parasitic beams 11 and the optical beam 20 emitted by the laser 18 propagating in the AOM 1 is illustrated. It is noted that the overmodulations 23 equal to the modulation frequency of the AOM 1, called $f_{ADM}$, were cancelled out. In general, all of the overmodulations 23 equal to $n \cdot f_{ADM}$, where n is an odd number, are cancelled out. This corresponds to the case in which the portion 11 reflected by the input face 9, 91 of the crystal 2 of the AOM 1 originates from an amplified return beam 25 having performed an odd number of outward-return journeys in the DOFA 16. It is also noted that only the overmodulation 23 equal to twice the modulation frequency $f_{AOM}$ of the AOM 1 is present. This corresponds to the case in which the portion 11 reflected by the input face 9, 91 of the crystal 2 of the AOM 1 originates from a return beam 25 having performed two outward-return journeys in the DOFA 16. The amplified return beams 25 having performed an equal number of outward-return journeys in the DOFA 16 greater than 2 are cut off by the closing of the AOM 1, the transit time in the downstream fibre 16, corresponding to the outward-return time, being greater than the open time of the AOM 1. It is worth noting that, in addition to observing a single overmodulation 23, this overmodulation 23 has a great stability. Such a stability can be used in the case in which a temporal profile having overmodulations 23 is of interest for the control of the non-linearities in the amplification stages. In particular, a reduction of the Brillouin effect can be achieved by this technique by postponing its appearance threshold by the careful choice of the amplitude of the overmodulation 23.

According to a second improvement of the DPOA 13 of the state of the art described above, the downstream fibre 16 is also a polarization-maintaining optical fibre over all or part of its length. This second improvement makes it possible to avoid a polarization modification of the optical beams 20, 22, 25, 106, 102 propagating in the downstream fibre 16.

This second improvement also makes it possible to standardize the fibres 15 and 16 around the AOM so as to simplify its manufacture. In this case, the fibre collimators used to inject and collect the light passing through the AOM 1 can be aligned without taking account of the maintenance of the polarization between the upstream 15 and downstream 16 fibres.

Figure 8:
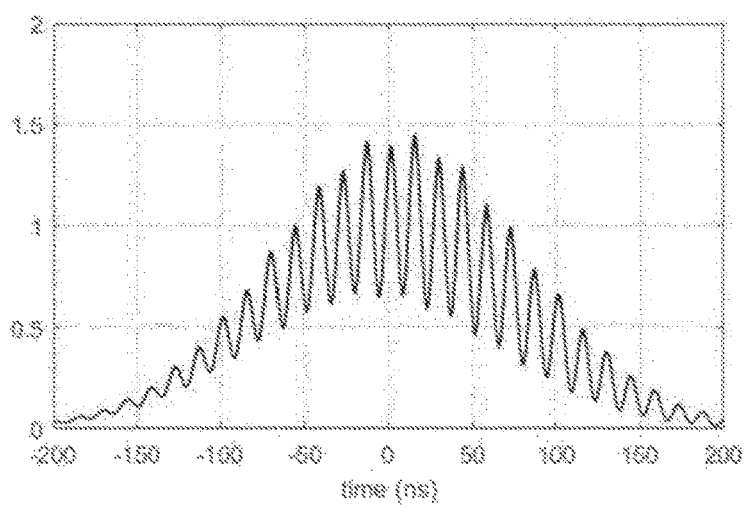
FIG. 8 illustrates a simulation of an optical pulse obtained by a DPOA of the state of the art comprising the first improvement according to the invention.
Figure 9:
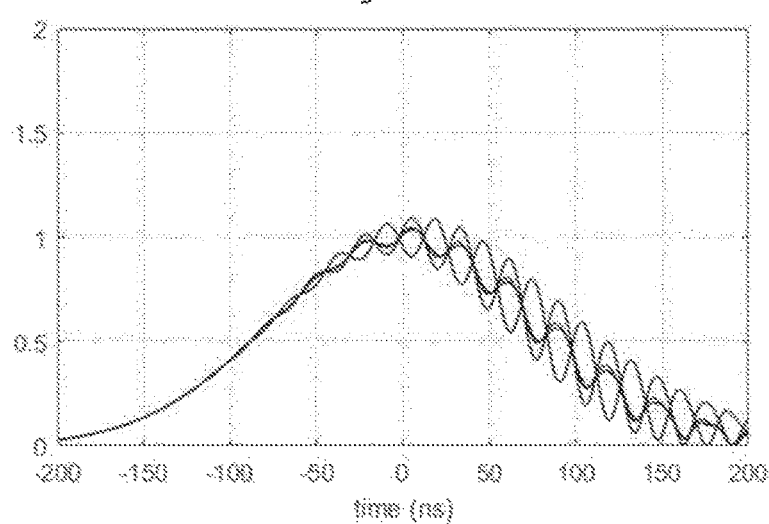
FIG. 9 illustrates a simulation of an optical pulse obtained by a DPOA of the state of the art comprising the third improvement according to the invention.

With reference to FIGS. 8 and 9, according to a third improvement of the DPOA 13 of the state of the art described above, it is proposed to increase the 1s transit time of the optical beams 20, 22, 25, 106, 102, 11 propagating in the downstream fibre 16 from the AOM 1 up to the Faraday mirror 17. In practice, the increase in this time interval consists of increasing the length of the downstream fibre 16. As illustrated in FIG. 8, when the increase in the length of the downstream fibre 16 is such that the increase in the transit time of the optical beams 20, 22, 106, 102, 11 in the downstream fibre 16 is equal to half of the open time of the AOM 1. The majority of the overmodulations 23 are cancelled out because the parasitic wave 11 reflected by the AOM 1 during the first passage of the return wave 25 arrives at the AOM 1 when it is closed after an outward-return journey. However, the duration of the amplified optical pulse 24 at the output 19 of the DPOA 13 is also reduced by half. As illustrated in FIG. 9, when the increase in the length of the downstream fibre 16 is such that the increase in the transit time of the optical beams 20, 22, 106, 102, 11 in the downstream fibre 16 is equal to a third of the open time of the AOM 1. A substantial portion of the overmodulations 23 are cancelled out. In this case, the duration of the amplified optical pulse 24 at the output 19 of the DPOA 13 is only reduced by a third.

Figure 10:
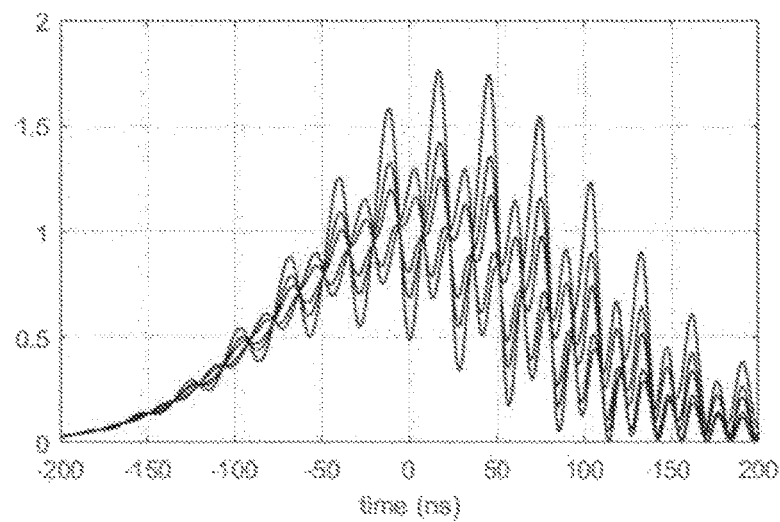
FIG. 10 illustrates a simulation of an optical pulse obtained by a DPOA of the state of the art comprising the third improvement according to the invention.

With reference to FIG. 10, the simulation of the overmodulations 23 caused by a DPOA 13 containing the first or the second improvement and the third improvement for which the increase in the transit time of the optical beams 20, 22, 106, 102, 11 in the downstream fibre 16 is equal to a third of the open time of the AOM 1 is illustrated. The combination of these two improvements makes it possible to cancel out the majority of the overmodulations 23.

According to a fourth embodiment of the DPOA 13 of the state of the art described above, the DPOA 13 of the state of the art comprises the AOM 1 according to the invention. In this case, the parasitic reflections 11 caused by the reflection on the input face 9, 91 of the crystal 2 of the AOM 1 of the return beam 22 originating from the DOFA 16 are reduced by 40 to 45 dB or 50 dB or 60 dB or more.

Figure 11:
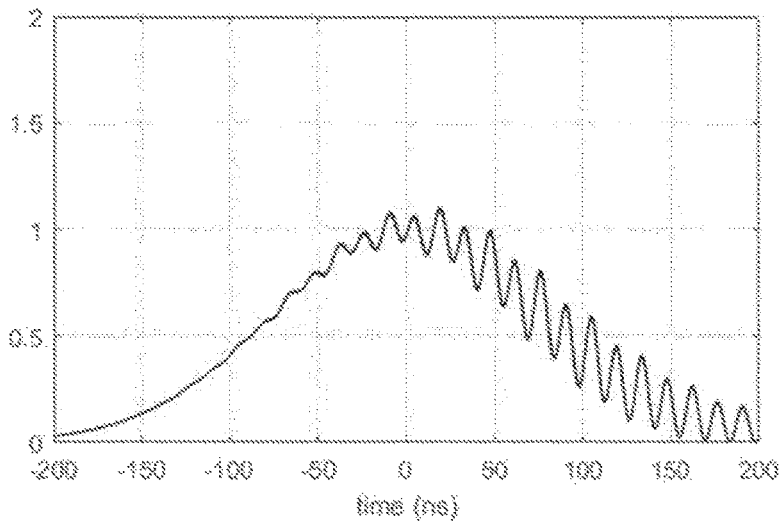
FIG. 11 illustrates a simulation of an optical pulse obtained by a DPOA of the state of the art comprising the first and third improvements according to the invention.
Figure 12:
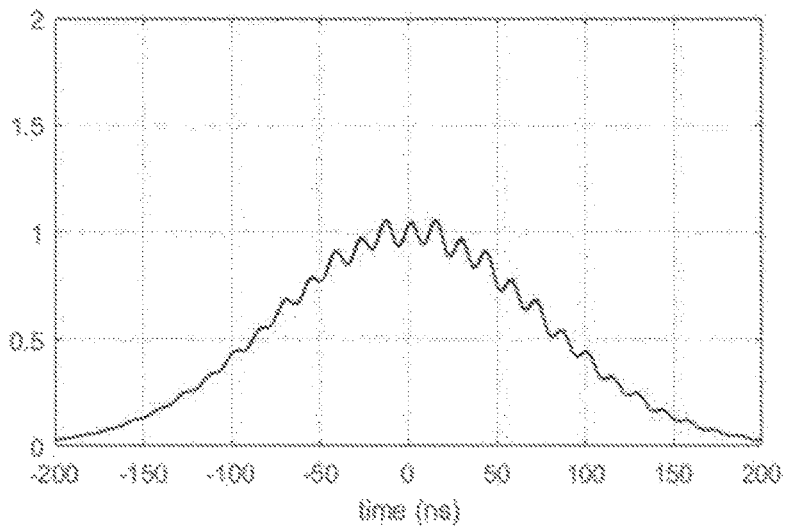
FIG. 12 illustrates a simulation of an optical pulse obtained by a DPOA of the state of the art comprising the first and fourth improvements according to the invention.

With reference to FIG. 11, the simulation of the overmodulations 23 caused by a DPOA 13 containing the first improvement and the fourth improvement is illustrated. The combination of these two improvements makes it possible to cancel out almost all of the overmodulations 23.

According to the invention, the improvements made to the DPOA 13 of the state of the art can be combined with one another. The effect of the improvements is cumulative. Therefore, according to the invention, the DPOA 13 of the state of the art comprises:

one of the improvements from among the first, second, third or fourth improvement, or any combination whatever of the first and/or second and/or third and/or fourth improvements, or all of the improvements.

Of course, the invention is not limited to the examples that have just been described, and numerous modifications may be made to these examples without exceeding the scope of the invention.

Thus, in variants which can be combined with one another of the embodiments previously described:

the direction of propagation 81 forms any angle whatever greater than 0° and/or less than 90° with the direction 82 in which the straight line of intersection extends, and/or the laser 18 is capable of emitting a continuous laser beam 20, and/or the laser 18 is capable of emitting a pulsed laser beam 20, and/or when the laser beam 20 emitted by the laser 18 is a pulsed beam, the processing unit is arranged and/or configured and/or programmed to control the laser 18 and the AOM 1 so that the opening of the AOM 1 coincides with the emission of the laser pulse 20 emitted by the laser 18.

In addition, the different characteristics, forms, variants and embodiments of the invention may be combined with one another in various combinations as long as they are not incompatible or mutually exclusive.

The invention claimed is:

1. An optical device comprising:
   an acousto-optic modulator (AOM);
   a laser generating an optical beam;
   an optical fibre, called upstream fibre, extending between the laser and the AOM, in which one or more optical beams is or are intended to propagate towards and/or originating from the AOM;
   a splitter which unilaterally connects the laser to the upstream fibre so that the optical beam emitted by the laser propagates in the upstream fibre in the direction of the AOM;
   an optical fibre, called downstream fibre, situated downstream of the AOM with respect to a direction linking the upstream fibre to the AOM, in which the optical beam(s) is/are intended to propagate towards and/or originating from the AOM;
   a reflection means connected to the downstream fibre of the AOM and arranged to reflect a beam originating from the downstream fibre into the downstream fibre;
   the upstream fibre is a polarization-maintaining optical fibre configured for maintaining a linear polarization state of an optical beam; and
   the downstream fibre is arranged so that a transit time of the optical beam in said downstream fibre from the AOM up to the reflection means is non-zero and less than or equal to half of an open time of the AOM; and/or
   the AOM comprises a crystal in which:
   at least one of two opposite faces, called the input/output faces, through which one or more optical beams is or are intended to enter and/or exit the crystal, forms a non-zero angle with a direction of propagation of the acoustic wave in the crystal, called direction of propagation;
   the input/output faces of the AOM are comprised in a plane extending from a face of the crystal, called injection face, in contact with a piezoelectric oscillator generating an acoustic wave propagating in the crystal up to a face of the crystal, called absorption face, on which an acoustic absorber at least partly absorbing the acoustic wave after it has propagated in the crystal from the injection face up to the absorption face is arranged.

2. The optical device according to claim 1, comprising a splitter arranged to unilaterally connect:
   an input of the device to a portion of the upstream fibre linking the splitter to the AOM so that an optical beam emitted by the laser, propagating in a portion of the upstream fibre linking the laser to the input of the optical device, is injected by the splitter in the portion of the upstream fibre linking the splitter to the AOM in the direction of the AOM; and
   the portion of the upstream fibre linking the AOM to the splitter at an output of the optical device so that a return beam propagating in the upstream fibre from the AOM towards the splitter is injected by the splitter towards the output of the optical device.

3. The optical device according to claim 1, in which the reflection means of an optical beam is configured for modifying the polarization of a polarized optical beam.

4. The optical device according to claim 1, in which the downstream fibre is a polarization-maintaining optical fibre.

5. The optical device according to claim 1, in which the downstream fibre is a pumped optical fibre amplifier.

6. The optical device according to claim 1, comprising a processing unit arranged and/or configured and/or programmed to control the laser and/or the acousto-optic modulator and/or pumping means associated with the pumped optical fibre so that the return beam at the output of the optical device is a pulsed optical beam having:
- a frequency greater than 100 Hz and/or less than 500 kHz; and/or
- a power greater than 10 mW and/or less than 500 W; and/or
- a temporal width greater than 1 nanosecond (ns) and/or less than 1 ms.

7. The optical device according to claim 1, in which the input/output faces of the crystal are arranged so that a zero angle is formed between:
- a direction of the optical beam(s) intended to enter the crystal and/or exit the crystal, after having exited the crystal, by one of the two input/output faces; and
- a direction of the optical beam(s) intended to enter the crystal and/or exit the crystal, after having exited the crystal, by the other of the two input/output faces.

8. The optical device according to claim 1, in which the direction of propagation is parallel to a line, called straight line of intersection, formed by an intersection between the two input/output faces of the crystal.

9. The optical device according to claim 1, in which the input/output faces of the crystal are parallel to one another and form a non-zero angle with the direction of propagation.

10. The optical device according to claim 1, in which an angle formed between one of the two input/output faces of the crystal and a direction of the optical beam(s) intended to enter the crystal and/or exit the crystal, after having exited the crystal, by said one of the two input/output faces is different from an angle formed between the other of the two input/output faces of the crystal and a direction of the optical beam(s) intended to enter the crystal and/or exit the crystal, after having exited the crystal, by said other of the two input/output faces.

11. The optical device according to claim 1, wherein the input/output faces of the crystal of the AOM form a non-zero angle with one another.

12. The optical device according to claim 1, wherein the reflection means modifies the polarization of the optical beam.

13. The optical device according to claim 12, wherein the reflection means modifies the polarization of an optical beam polarized linearly by a value of 90°.

14. The optical device according to claim 11, wherein the reflection means comprises a Faraday rotator mirror.

15. The optical device according to claim 12, wherein the reflection means comprises a Faraday rotator mirror.

16. The optical device according to claim 1, wherein the splitter is a polarization splitting coupler.

* * * * *